(12) United States Patent
Lee

(10) Patent No.: US 6,791,790 B2
(45) Date of Patent: Sep. 14, 2004

(54) HARD DISK DRIVE HAVING AIR PUMPING GROOVE

(75) Inventor: Hong-kwon Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/361,636

(22) Filed: Feb. 11, 2003

(65) Prior Publication Data

US 2003/0151848 A1 Aug. 14, 2003

(30) Foreign Application Priority Data

Feb. 14, 2002 (KR) .......................................... 2002-7957

(51) Int. Cl.[7] ............................................. G11B 33/14
(52) U.S. Cl. ................................................. 360/97.02
(58) Field of Search ........................... 360/97.01, 97.02

(56) References Cited

U.S. PATENT DOCUMENTS 5,333,079 A     7/1994  Takegami et al.
6,088,190 A  *  7/2000  Anderson ................ 360/97.02
6,236,532 B1 *  5/2001  Yanagisawa ............. 360/97.02
6,466,398 B1 * 10/2002  Butler et al. ............. 360/97.02
2002/0154441 A1 * 10/2002  Tadepalli et al. ........ 360/97.02

FOREIGN PATENT DOCUMENTS

JP        8293191        5/1996

\* cited by examiner

Primary Examiner—George J. Letscher
(74) Attorney, Agent, or Firm—Staas & Halsey LLP

(57) ABSTRACT

In a hard disk drive, at least one groove is formed in any of the base plate and the cover plate to pump air toward an outer side of the disk. An outer end of the groove is located at a position inwardly separated from an edge of the disk such that an air journal zone of predetermined width is formed along a circumferential direction of the disk between the outer end of the groove and the edge of the disk. The groove is formed in multiple numbers in a circumferential direction of the disk at a predetermined interval and is extended in a radial direction from an inner side of the disk and curved in a direction in which the disk rotates. Thus, vibration of the disk is reduced by a damping operation of air pumped by the groove having a high pressure in the air journal zone.

14 Claims, 6 Drawing Sheets

HARD DISK DRIVE HAVING AIR PUMPING GROOVE

CROSS-REFERENCE TO RELATED APPLICATIONS

This application claims the benefit of Korean Application No. 2002-7957, filed Feb. 14, 2002, in the Korean Intellectual Property Office, the disclosure of which is incorporated herein by reference.

BACKGROUND OF THE INVENTION

1. Field of the Invention

The present invention relates to a hard disk drive, and more particularly, to a hard disk drive which can reduce vibration of a disk.

2. Description of the Related Art

A hard disk drive (HDD) is an auxiliary memory device of a computer that reads out data from a magnetic disk or records data on the disk by using a magnetic head. Recently, a variety of research and development efforts have focused on realizing a high speed, high capacity, low vibration, and low noise hard disk drive.

FIG. 1 is a perspective view showing a conventional hard disk drive. FIG. 2 is a vertical sectional view of the hard disk drive of FIG. 1.

Referring to FIG. 1, a conventional hard disk drive includes a housing 10, a spindle motor 30 installed in the housing 10 to rotate a magnetic disk (a hard disk) 20, and an actuator 40 having a magnetic head for recording and reading out data on and from the disk 20. The following description relates to one magnetic disk 20, although two are shown in FIGS. 1 and 2.

The housing 10 is installed in a main body of a computer and includes a base plate 11 to support the spindle motor 30 and the actuator 40, and a cover plate 12 coupled to the base plate 11 to enclosing and protecting the disk 20. The housing 10 is typically manufactured of a stainless steel or aluminum material.

The disk 20 is a recording medium for recording data and may be a single disk or a plurality of disks capable of being rotated by the spindle motor 30. If a hard disk drive has a plurality of disks, they are installed to be separated a predetermined distance from each other.

Referring to FIG. 2, the spindle motor 30 is supported by a flange 31 fixedly installed on the base plate 11. Typically, an upper end portion of a shaft 32 of the spindle motor 30 is fixedly coupled to the cover plate 12 by a screw 36. A hub 33 is rotatably installed around the outer circumferential side of the shaft 32 by interposing a bearing 37 therebetween. The disk 20 is inserted around the outer circumferential side of the hub 33. When a plurality of disks are installed, a ring type spacer 34 for maintaining a distance between the disks 20 is installed at the outer circumferential side of the hub 33. A clamp 35 for preventing escape of the disk 20 is coupled to an upper end portion of the hub 33.

Historically, storage capacity of hard disk drives has gradually increased. The storage capacity of a hard disk drive is proportional to a surface recoding density which is determined by the multiplication of a linear recoding density expressed by BPI (bits per inch) and a track density expressed by TPI (tracks per inch). BPI is totally affected by the development of a magnetic recording technology while TPI is mainly dependent on the improvement of a mechanical dynamic characteristic.

Track Misregistration (TMR) is a malfunction generated when data is recorded or reproduced on or from a track of a disk and is an important factor that restricts TPI and is therefore related to the storage capacity of the hard disk drive. A direct source of TMR is vibration of a disk. Disk vibration can be attributed to three sources: non-repeatable runout (NRRO) due to a defective ball bearing of the spindle motor, disk rocking motion due to gyro-moment of a rotating disk, and disk fluttering.

To increase reliability of performance of a hard disk drive by reducing TMR, disk vibration generated during operation needs to be reduced. Accordingly, as shown in FIG. 3, it is a recent trend to decrease a gap between the disk 20 and each of a base plate 11' and a cover plate 12' by forming the surfaces of the plates 11' and 12' facing the disk 20 to protrude toward the disk 20. When the gap between the disk 20 and each of the plates 11' and 12' is sufficiently narrow, disk vibration is reduced by air compressed therebetween. But when the gap between the disk 20 and each of the plates 11' and 12' decreases, a relatively small external impact may cause, the disk 20 to collide against the base plate 11' or the cover plate 12', thereby damaging the disk 20. So while the damping effect by compressed air increases as the gap between the disk 20 and each of the plates 11' and 12' decreases, the disk 20 is more easily damaged. Thus, there is a limit in reducing the gap. Typically, the gap between the disk 20 and each of the plates 11' and 12' is about 1 millimeter, which provides a damping effect by compressed air. However, a sufficient disk vibration reducing effect cannot be obtained.

SUMMARY OF THE INVENTION

To solve the above-described problems, it is an aspect of the present invention to provide a hard disk drive in which air pumping grooves for pumping air toward the outer circumferential side of a disk to reduce vibration of the disk are provided in the base plate and the cover plate.

Additional aspects and advantages of the invention will be set forth in part in the description which follows and, in part, will be obvious from the description, or may be learned by practice of the invention.

To achieve the above and/or other aspects, there is provided a hard disk drive comprising a housing having a base plate and a cover plate, a spindle motor installed on the base plate, at least one data storage disk installed at the spindle motor, and an actuator, pivotably installed on the base plate and having a magnetic head recording and reading out data on and from the disk. At least one groove to pump air toward an outer circumferential side of the disk is formed in any one of the surfaces of the base plate and the cover plate which faces the disk. An outer end of the groove is located at a position inwardly separated a predetermined distance from an edge of the disk such that an air journal zone having a predetermined width is formed along a circumferential direction of the disk between the outer end of the groove and the edge of the disk. Vibration of the disk is thereby reduced by a damping operation of compressed air pumped by the groove having a high pressure in the air journal zone.

It is an aspect of the present invention that a protruding surface protruding to a predetermined height toward the disk is formed at at least one of an upper surface of the base plate and a lower surface of the cover plate to reduce a distance from the disk, and the groove is formed in the protruding surface.

It is an aspect of the present invention that the groove is formed in multiple numbers in a circumferential direction of the disk at a predetermined interval, and that the groove is extended in a radial direction from an inner circumferential side of the disk and curved in a direction in which the disk rotates.

It is an aspect of the present invention that a bottom surface of the groove is inclined toward the disk at an outer end portion of the groove.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
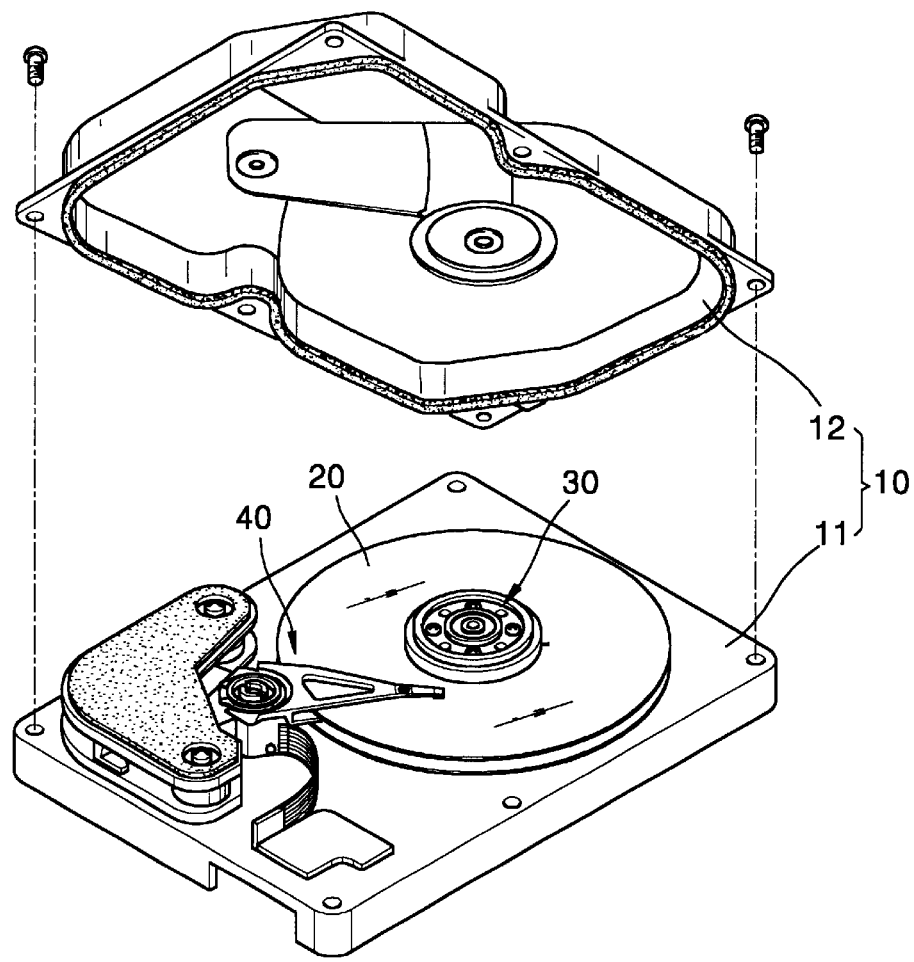
FIG. 1 is a perspective view showing a conventional hard disk drive.
Figure 2:
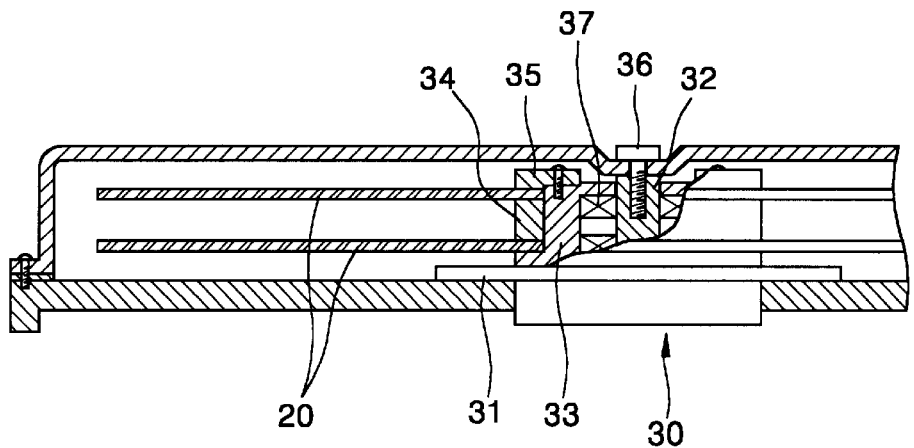
FIG. 2 is a vertical sectional view of the hard disk drive of FIG. 1.
Figure 3:
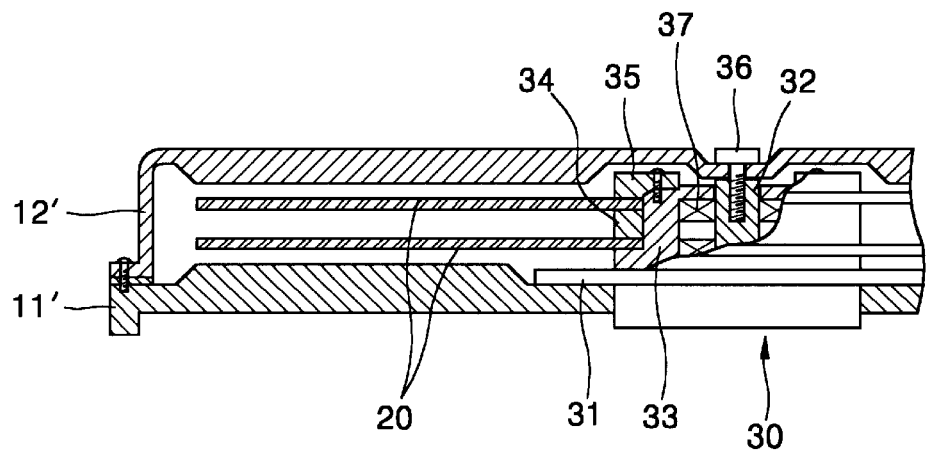
FIG. 3 is a vertical section view of another conventional hard disk drive.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 4:
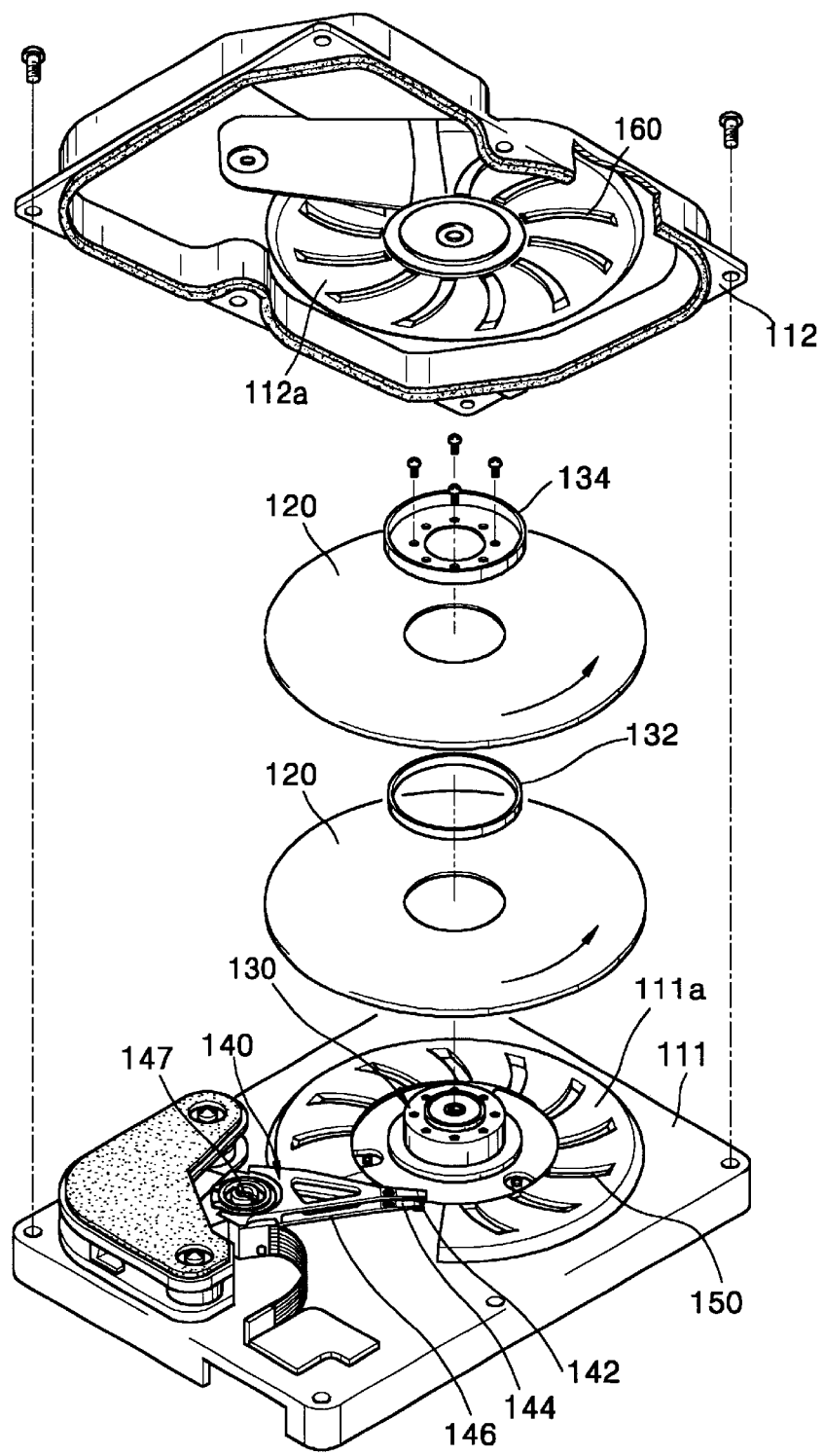
FIG. 4 is an exploded perspective view of a hard disk drive according to a first embodiment of the present invention.
Figure 5:
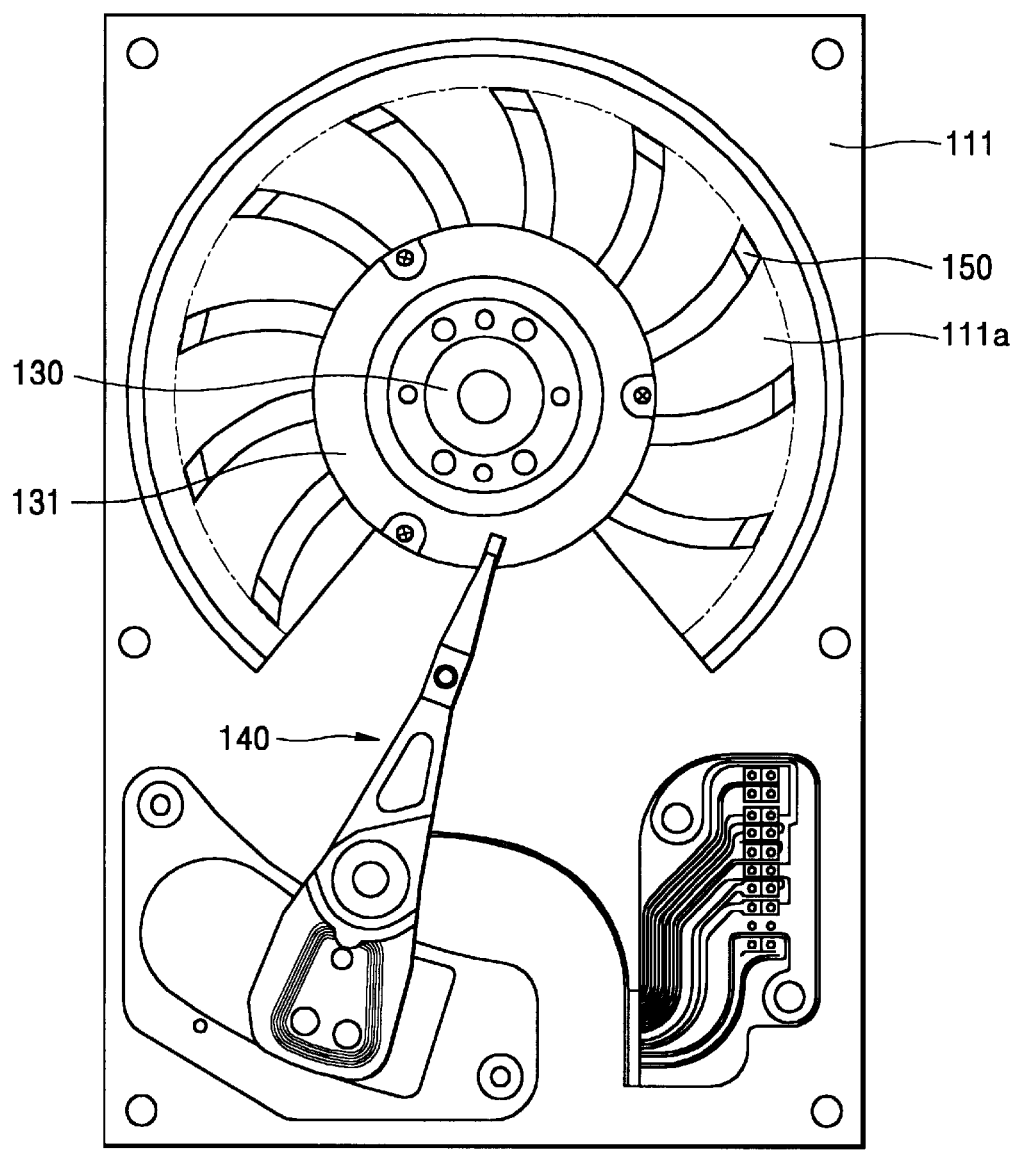
FIG. 5 is a plan view of a base plate shown in FIG. 4.
Figure 6:
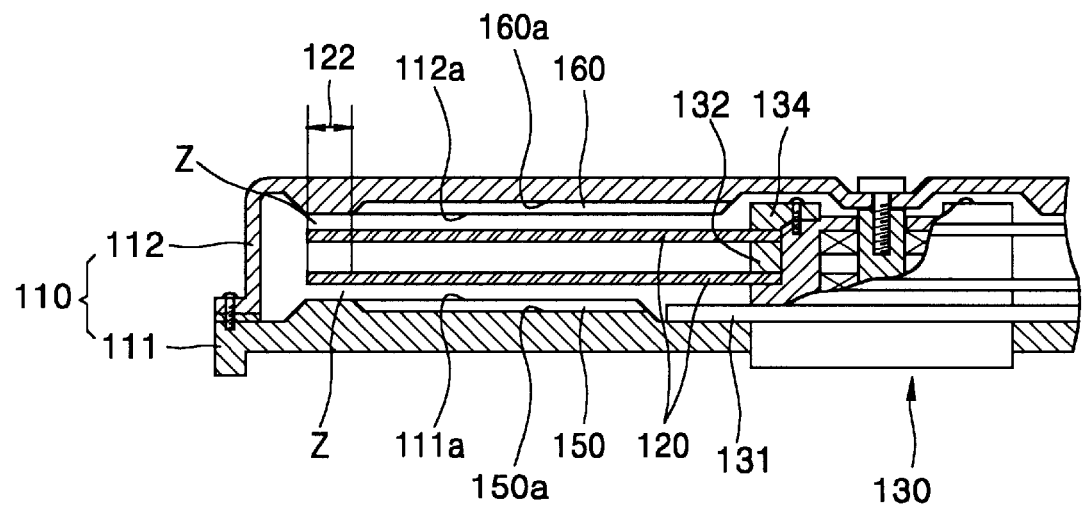
FIG. 6 is a vertical sectional view of the hard disk drive of FIG. 4, taken along a groove.

Referring to FIGS. 4 through 6, a hard disk drive according to an embodiment the present invention includes a housing 110 in which a spindle motor 130, magnetic disks 120, and an actuator 140 are installed.

The housing 110 is installed in a main body of a computer and includes a base plate 111 for supporting the spindle motor 130 and the actuator 140, and a cover plate 112 coupled to the base plate 111 for enclosing and protecting the disks 120. The housing 110 is typically manufactured of a stainless steel or aluminum material. Protruding surfaces 111a and 112a are formed at each of the upper surface of the base plate 111 and the lower surface of the cover plate 111 to protrude toward the disks 120 at a predetermined height. The protruding surfaces 111a and 112a decrease a gap between each disk and the respective plates 111 and 112 to reduce disk vibration.

A single disk 120 or a plurality of disks 120 as a recording medium for recording data are installed in the housing 110. The spindle motor 130 rotates the disks 120 and is supported by a flange 131 fixedly installed at the base plate 111. When a plurality of the disks 120 are installed at the spindle motor 130, a ring type spacer 132 for maintaining a gap between the disks 120 is inserted between the disks 120. A clamp 134 for preventing escape of the disks 120 is coupled to an upper end portion of the spindle motor 130.

The actuator 140 records and reproduces data on and from the disks 120 and is installed on the base plate 111 to be capable of pivoting. The actuator 140 includes an arm 146 coupled to a pivot shaft 147 to be capable of pivoting, and a suspension 144 installed at the arm 146 and supporting a slider 142 to be elastically biased toward the surface of the disks 120.

In the hard disk drive according to the present embodiment, air pumping grooves 150 and 160 for pumping air toward the outer circumferential side of the disks 120 are provided as a way to reduce vibration of a disk. At least one, though preferably a plurality, of the grooves 150 and 160 are formed in each of the protruding surfaces 111a and 112a of the base plate 111 and the cover plate 112 at a predetermined interval. The protruding surfaces 11a and 112a are typically formed to have a "C" shape. The "C" shape is open around the spindle motor 130, in the area in which the actuator 140 operates, to avoid interference with the actuator 140. In configurations where no interference by the actuator occurs, the protruding surfaces 111a and 112a can be formed to have a "O" shape to face the entire surface of the disks 120. thus, the grooves 150 and 160 can be formed partially or entirely along the circumferential direction of the disks 120 according to the shape of the protruding surfaces 111a and 112a.

The grooves 150 and 160 have a shape extending outwardly in a radial direction from the inner circumferential side of the disks 120 and are curved along the rotational direction of the disks 120 (in a direction indicated by an arrow shown in FIG. 4). The outer ends of the grooves 150 and 160 are separated a predetermined distance from the edge of the disks 120 in a horizontal direction. Accordingly, an air journal zone Z having a predetermined width is formed along the circumferential direction between the outer end of the grooves 150 and 160 and the edge of the disks 120. According to the above structure, when the disks 120 rotate, air between the disks 120 and the plates 111 and 112 is pumped toward the outer circumferential side of the disks 120 by the grooves 150 and 160, so that the pressure of air in the air journal zone Z increases.

Preferably, bottom surfaces 150a and 160a of the grooves 150 and 160 are inclined toward the disks 120 at the outer end portions of the grooves 150 and 160. Thus, the air flowing along the grooves 150 and 160 can be smoothly exhausted toward edge portions 122 of the disks 120 without forming turbulence at the outer end portions of the grooves 150 and 160.

Figure 7:
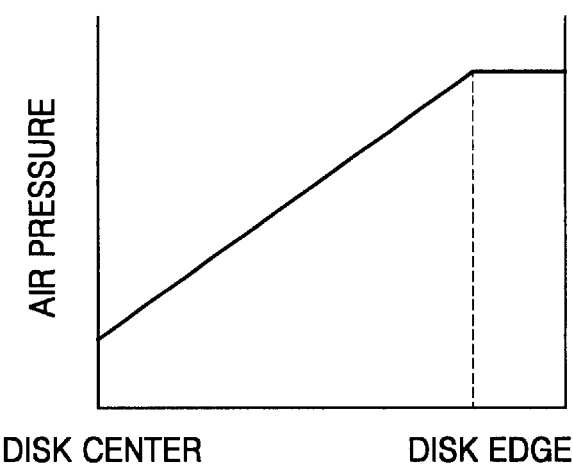
FIG. 7 is a graph showing the distribution of pressure of air between the disk and each of the plates in the hard disk drive of FIG. 4.

As described above, the air pumped toward the edge portion 122 of the disks 120 by the grooves 150 and 160 increases pressure of the air in the air journal zone Z formed at the edge portion 122 of the disks 120. That is, as shown in FIG. 7, the air pressure between the disks 120 and the protruding surfaces 111a and 112a of each of the plates 111 and 112 gradually increases from the center of the disks 120 toward the edge portion 122 of the disks 120.

The air pressure in the air journal zone Z is formed to be relatively high compared to the conventional technology, so that disk vibration such as a disk locking motion and disk fluttering can be sufficiently reduced by an air damping operation. Also, considering that vibration is most severely generated at the edge portion 122 of the disks 120, the air journal zone Z exhibiting a high air pressure is formed at the edge portion 122 of the disks 120 so that vibration of the disks 120 can be effectively reduced.

Further, according to the present invention, while a gap between the disks 120 and the base plate 111 and the cover plate 112 is sufficiently maintained such that the disks 120 do not contact the respective plates 111 and 112 as a result of an external impact, the air pressure between the disks 120 and the respective plates 111 and 112 can be sufficiently increased so that the air damping effect can be sufficiently obtained.

Although the air pumping grooves are described above as being formed in both the base plate 111 and the cover plate 112, they can be formed in any one of the plates 111 and 112. For example, when a single disk is used, the grooves can be formed in either the base plate 111 or the cover plate 112. However, as described above, when the grooves are formed in both of the plates 111 and 112, a superior air damping effect can be obtained. Also, the protruding surfaces 111a and 112a may be formed in only one of the plates 111 and 112. And accordingly, the grooves may be formed in only one protruding surface.

Figure 8:
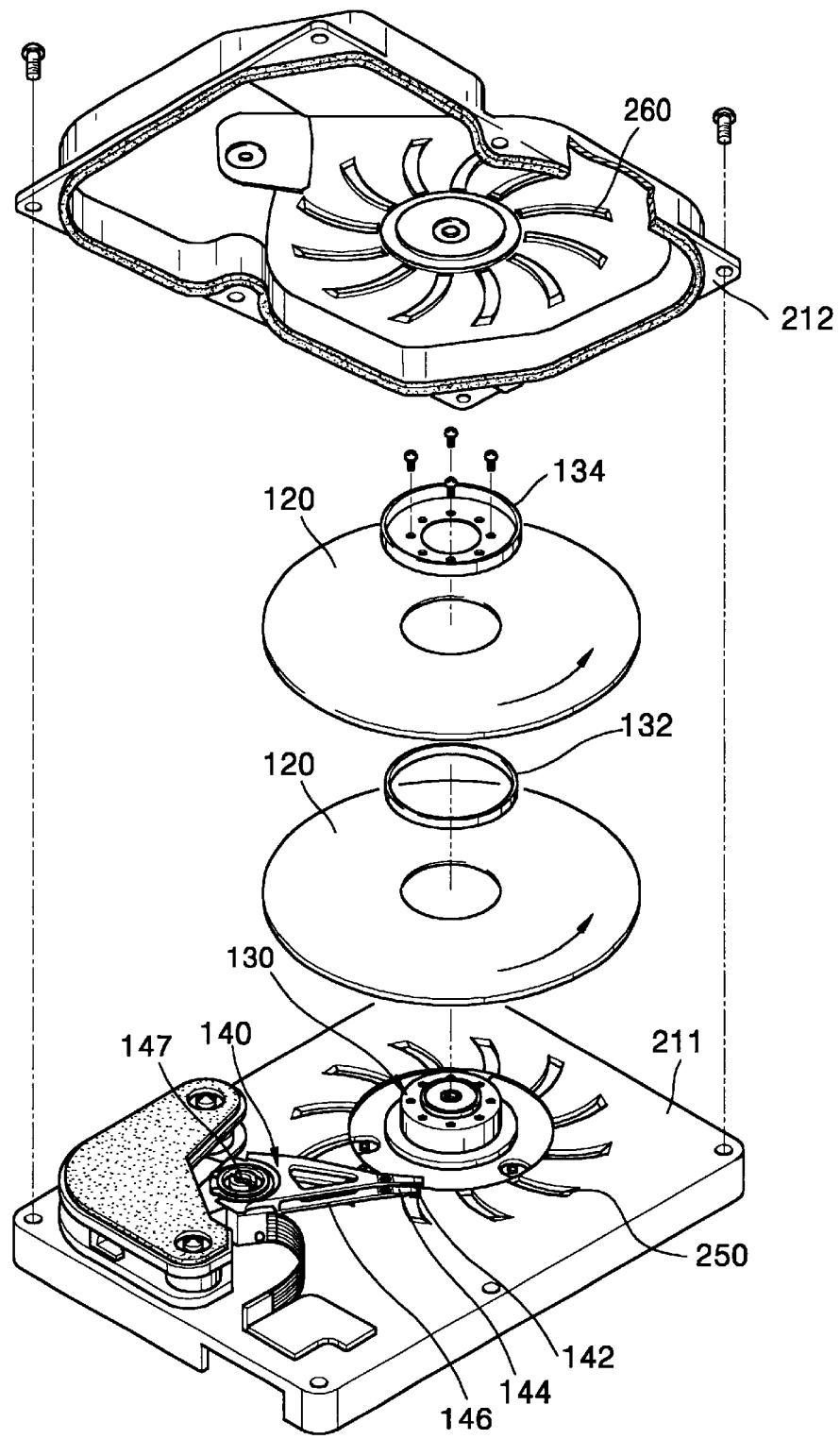
FIG. 8 is an exploded perspective view of a hard disk drive according to a second embodiment of the present invention.

FIG. 8 is an exploded perspective view showing a hard disk drive according to a second embodiment of the present invention. Here, the same reference numerals as those in FIG. 4 indicate the same elements.

As shown in the drawing, air pumping grooves 250 and 260 can be formed in a base plate 211 and a cover plate 212 in which surfaces facing the disks 120 are not protruding. In this case, since the actuator 140 and the protruding surfaces (111a and 112a of FIG. 4) do not interfere with each other, the grooves 250 and 260 can be formed throughout the entire circumferential direction of the disks 120. Since the shape and operation of the grooves 250 and 260 in the present embodiment are the same as those in the first preferred embodiment, a detailed description thereof will be omitted.

Like in the first embodiment, the air pumping grooves can be formed in any one of either the base plate 211 or the cover plate 212.

As described above, according to the present invention, the air journal zone exhibits a relatively higher air pressure and is formed at the edge portion of the disks by the grooves formed in the base plate and the cover plate so that vibration of the disks is reduced by a damping operation. Also, while a gap between the disks and each of the base plate and the cover plate is maintained such that the disks do not contact the respective plates by an external impact, since the air pressure between the disks and the respective plates can be sufficiently raised, a satisfactory air damping effect can be obtained. Thus, TMR of a hard disk drive is reduced and reliability in data recording and reproduction is improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hard disk drive comprising:
   a housing having a base plate and a cover plate;
   a spindle motor installed on the base plate;
   a data storage disk installed at the spindle motor; and
   an actuator pivotably installed on the base plate and having a magnetic head recording and reading out data on and from the disk,
   wherein a groove is formed in a surface that faces the disk of any of the base plate and the cover plate, to pump air toward an outer circumferential side of the disk, an outer end of the groove is located at a position inwardly separated a predetermined distance from an edge of the disk such that an air journal zone having a predetermined width is formed along a circumferential direction of the disk between the outer end of the groove and the edge of the disk.

2. The hard disk drive as claimed in claim 1, further comprising:
   a protruding surface protruding a predetermined height toward the disk from at least one of an upper surface of the base plate and a lower surface of the cover plate to reduce a distance from the disk; and
   the groove is formed in the protruding surface.

3. The hard disk drive as claimed in claim 2, wherein:
   the groove is formed in multiple numbers in a circumferential direction of the disk at a predetermined interval.

4. The hard disk drive as claimed in claim 2, wherein:
   the groove is extended in a radial direction from an inner circumferential side of the disk and curved in a direction in which the disk rotates.

5. The hard disk drive as claimed in claim 2, wherein:
   an outermost surface of the groove is inclined toward the disk at an outer end of the groove.

6. The hard disk drive as claimed in claim 1, wherein:
   the groove is formed in multiple numbers in a circumferential direction of the disk at a predetermined interval.

7. The hard disk drive as claimed in claim 1, wherein:
   the groove is extended in a radial direction from an inner circumferential side of the disk and curved in a direction in which the disk rotates.

8. The hard disk drive as claimed in claim 1, wherein:
   an outermost surface of the groove is inclined toward the disk at an outer end portion of the groove.

9. A hard disk drive comprising:
   a storage disk; and
   a housing having a groove positioned therein to channel fluid to an outer circumference of the disk to reduce vibration, an outer portion of the groove being positioned inwardly from an edge of the storage disk.

10. The hard disk drive of claim 9, wherein:
    an outermost surface of the groove is inclined toward the disk at the outer end of the groove.

11. The hard disk drive of claim 9, wherein:
    the housing and the storage disk are separated by a predetermined distance such that no contact occurs between the housing and the storage disk when an external impact of predetermined magnitude is applied to the hard disk drive.

12. The hard disk drive of claim 9, wherein:
    the housing has an upper and a lower portion; and
    a plurality of grooves are disposed on the upper and lower portions of the housing at predetermined intervals.

13. The hard disk drive of claim 12, wherein:
    the grooves extend from an inner circumference of the disk; and
    the grooves are curved in a direction in which the disk rotates.

14. A hard disk drive having a storage disk, the hard disk drive comprising:
    a housing having a groove positioned therein, with an outer portion of the groove being positioned inwardly from an edge of the storage disk, to channel fluid to an outer circumference of the disk and create a fluid journal zone to reduce vibration of the storage disk.

* * * * *